United States Patent [19]

Yamasaki

[11] 4,402,587
[45] Sep. 6, 1983

[54] PHOTOMETRIC MODE SWITCHING APPARATUS FOR CAMERAS OF AUTOMATIC EXPOSURE CONTROL TYPE

[75] Inventor: Masafumi Yamasaki, Hachioji, Japan

[73] Assignee: Olympus Optical Company Ltd., Tokyo, Japan

[21] Appl. No.: 303,131

[22] Filed: Sep. 15, 1981

[30] Foreign Application Priority Data

Nov. 8, 1980 [JP] Japan ................................ 55-157286

[51] Int. Cl.³ .............................................. G03B 7/08
[52] U.S. Cl. ...................................... 354/31; 354/59; 354/289
[58] Field of Search ........................... 354/31, 59, 289

[56] References Cited

U.S. PATENT DOCUMENTS

| | | | |
|---|---|---|---|
| 3,973,266 | 8/1976 | Kakunodate et al. ................ | 354/31 |
| 4,075,640 | 2/1978 | Ueda et al. ............................. | 354/59 |
| 4,322,142 | 3/1982 | Kawamura et al. ................... | 354/31 |

FOREIGN PATENT DOCUMENTS

| | | | |
|---|---|---|---|
| 54-151029 | 11/1979 | Japan .................................... | 354/31 |
| 55-35316 | of 0000 | Japan . | |
| 55-52035 | 4/1980 | Japan .................................... | 354/31 |

Primary Examiner—Russell E. Adams
Attorney, Agent, or Firm—Weinstein & Sutton

[57] ABSTRACT

A photometric mode switching apparatus for a camera of the automatic exposure control type includes a first switch which is used to select a particular photometric mode, and a second switch which is interlocked with a storage switch contained in a spotwise photometry circuit. Unless the two switches are operated to establish a spotwise photometric mode, the camera is caused to operate in the average photometric mode.

5 Claims, 3 Drawing Figures

PHOTOMETRIC MODE SWITCHING APPARATUS FOR CAMERAS OF AUTOMATIC EXPOSURE CONTROL TYPE

BACKGROUND OF THE INVENTION

The invention relates to a photometric mode switching apparatus for cameras of the automatic exposure control type, and more particularly, to such apparatus for use with a camera of the automatic exposure control type which permits a selection between an average photometry and a localized or spotwise photometry.

As is well recognized, a photometric technique utilized in the camera of the automatic exposure control type of the prior art can be categorized into an average photometry and a localized or spotwise photometry. The average photometry provides a passable result for ordinary objects being photographed, and is easier to use as compared with the spotwise photometry. In general, almost all cameras employ this technique. On the other hand, the spotwise photometry can be advantageously utilized as when it is desired to establish a desired exposure upon an object being photographed which exhibits a high contrast ratio.

Recently, a camera has been proposed having both the average and the spotwise photometry capability so that a user can suitably choose either photometric mode in taking pictures. A camera of this kind is also known in which a photometric operation in either mode is performed in interlocked relationship with a shutter release operation and in which a switching between the both photometric modes is achieved by a single mode selecting switch.

It will be understood that as a variation of the spotwise photometry, an exposure value storing photometric technique is available in which an exposure value is previously determined by a manual operation before a shutter release takes place. With the camera having the both capabilities for the average photometry and the spotwise photometry and which is designed to permit a storage of the exposure value, it is necessary when taking a picture according to the spotwise photometry method that a storage switch be operated to preset the exposure, in addition to operating the mode selecting switch. Considering the manual operation of the storage switch which is utilized during a spotwise photometric mode, it will be recognized that most objects being photographed are centrally disposed within the image field, and hence the spotwise photometry takes place of the central region of the image field. It is to be noted that a user may sometimes choose a photographic composition in which the image of a desired object being photographed be taken in a corner, for example, remote from the central region of the image field. In such instance, the camera is initially focussed to the object being photographed which is centrally located on the image field and then the storage switch is manually operated to complete the photometry of the brightness of the object being photographed. Subsequently, the camera is redirected so that the object be disposed at a desired location on the image field before a shutter release takes place. In this manner, a sophisticated photographing can be achieved which reflects the intention of the user.

Therefore, it will be seen that a camera of the automatic exposure control type which permits a free choice between the average photometry and the spotwise photometry enables a variety of pictures to be taken from the sophisticated composition to snap shots, affording a flexibility and a convenience in use.

However, a camera of the type described requires the provision of the storage switch which is manually operated during the spotwise photometry, in addition to the mode selecting switch. This induces the following difficulties:

(1) When a user of the camera desired to take a picture in the average photometric mode, he may make a wrong recognition that the average photometric mode is established in the camera when in actuality the mode selecting switch is thrown to a position corresponding to the spotwise photometric mode. If he directly releases the shutter, a wrong exposure results since the storage switch which is utilized to store exposure information is not manually operated and the camera operates in the spotwise photometric mode without exposure information.

(2) When a user of the camera desires to take a picture in the spotwise photometric mode, he may inadvertently forget that the storage switch has not been operated to store exposure information though he is aware of the fact that the mode selecting switch has been thrown to the position corresponding to the spotwise photometric mode. In this instance, a shutter release again results in a wrong exposure as mentioned above.

Thus a user of the camera may forget operating either the mode selecting switch or the storage switch. In either instance, the problem that a wrong exposure may be caused by the failure to supply exposure information during the spotwise photometric mode as a result of forgetting a switching operation before taking a picture is inherent in a camera having the capabilities for both the average and the spotwise photometry and in which an exposure control during the spotwise photometric mode takes place in accordance with a stored value of the brightness of object being photographed which is supplied through the manually operated storage switch.

SUMMARY OF THE INVENTION

It is an object of the invention to provide a photometric mode switching apparatus in which an exposure control takes place in either the average or the spotwise photometry mode by a logical determination of outputs from a first switch which is used to select a photometric mode and a second switch which is interlocked with a manually operated storage switch.

According to the invention, the failure of operation the first switch which selects a desired photometric mode or the second switch which is interlocked with the storage switch results in the average photometric mode being established automatically, which produces a passable photographing result. In this manner, a wrong exposure during the spotwise photometric mode can be avoided. In this sense, the apparatus of the invention can be said as a photographic fail-safe unit.

DESCRIPTION OF PREFERRED EMBODIMENT

Figure 1:
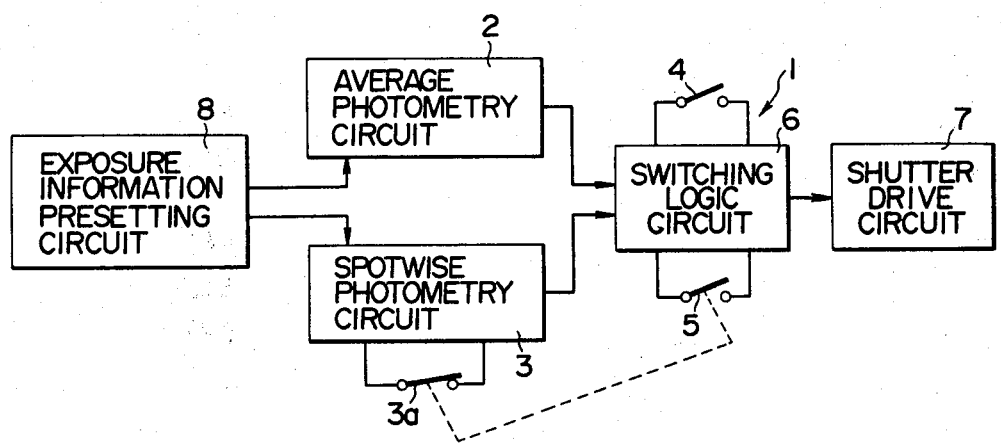
FIG. 1 is a block diagram of a camera of automatic exposure control type which incorporates a photometric mode switching apparatus according to the invention.

Referring to FIG. 1, there is shown a camera of the automatic exposure control type which incorporates the photometric mode switching apparatus of the invention. In this Figure, a photometric mode switching apparatus 1 is connected to the output of an average photometry circuit 2 and a spotwise photometry circuit 3. The spotwise photometry circuit 3 is associated with a storage switch 3a which is utilized to store a photometric value representing the brightness of an object being photographed. The apparatus 1 comprises a first switch 4 which is used to select a particular photometric mode, a second switch 5 which is inerlocked with the storage switch 3a, and a switching logic circuit 6 which responds to the outputs from the first and the second switch 4, 5 to pass either the output of the average photometry circuit 2 or the spotwise photometry circuit 3 to a shutter drive circuit 7. It is to be understood that both the first and the second switch 4, 5 are disposed on the exterior of the camera at a location which facilitates their manual operation. Both the average and the spotwise photometry circuit 2, 3 receive an output from exposure information presetting circuit 8 as their input.

Figure 3:
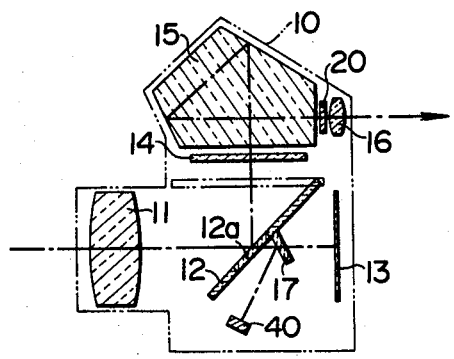
FIG. 3 is a schematic cross section of the camera, illustrating the arrangement of photometric or photoelectric transducer elements shown in FIG. 2.
Figure 2:
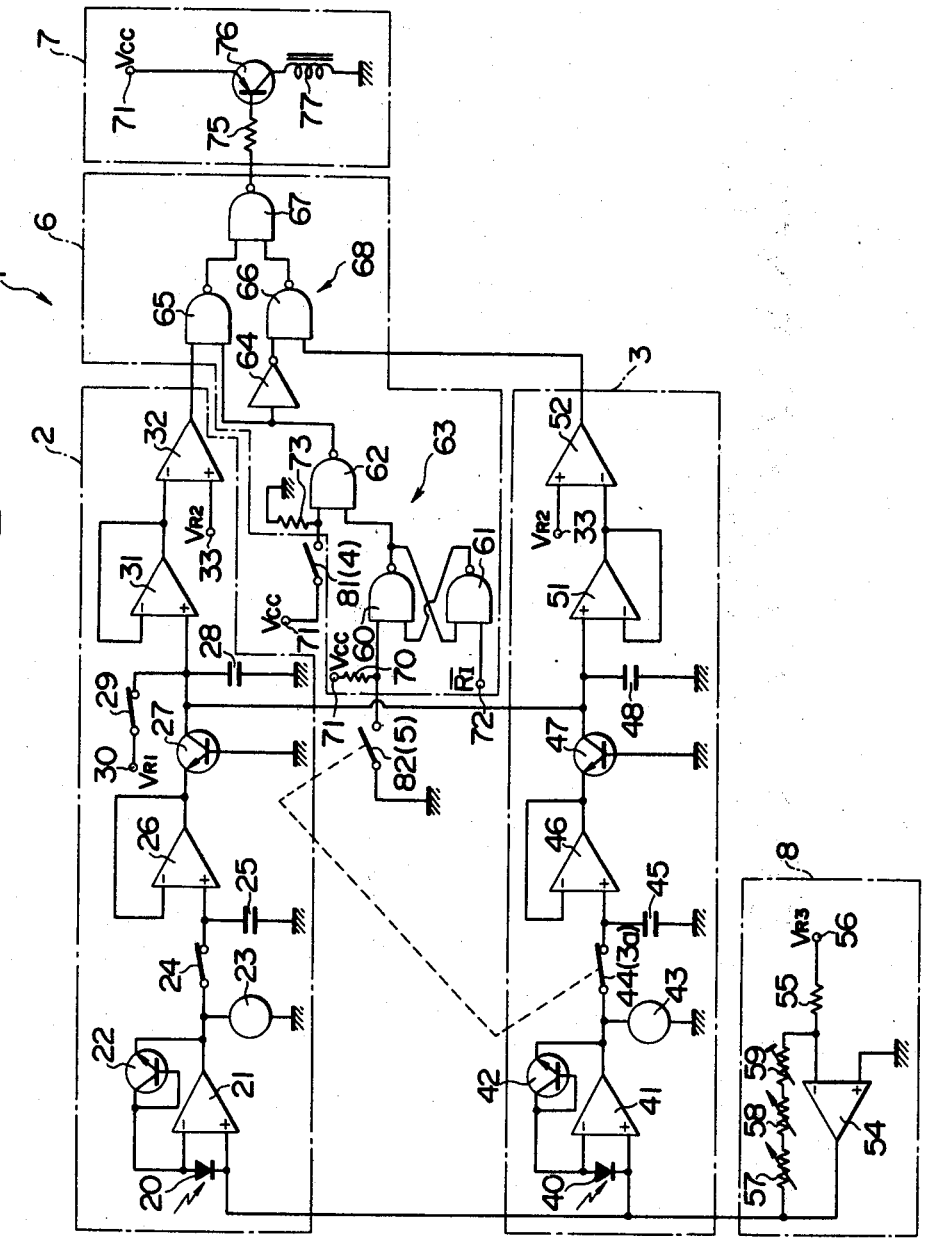
FIG. 2 is a circuit diagram of a specific circuit contained in the camera shown in FIG. 1.

A specific circuit arrangement of the camera shown in FIG. 1 is illustrated in FIG. 2. In FIG. 2, the average photometry circuit 2 includes an operational amplifier 21 having an inverting and a non-inverting input terminal across which a photoelectric transducer element 20 is connected, with its anode connected to the inverting input terminal, for the purpose of average photometry. In addition, a logarithmic compression circuit comprising an NPN transistor 22 is connected across the output terminal and the inverting input terminal of the amplifier 21, with the transistor 22 having its collector and base connected together and connected to the inverting input terminal and its emitter connected to the output terminal of the amplifier. As shown in FIG. 3, light from an object being photographed which is incident on the camera 10 passes through a taking lens 11 and is then reflected by a movable mirror 12 to follow a path including a focussing glass 14, which is located at a position conjugate with a film 13, a pentaprism 15 and an eyepiece 16 of a viewfinder, and the transducer element 20 is disposed within the finder such as between the pentaprism 15 and the eyepiece 16 so as to receive part of such light, whereby a photometry of a relatively extensive area of the image of an object being photographed, or substantially the entire image field is made.

As shown in FIG. 2, the output terminal of the operational amplifier 21 is connected to the ground through photographing information display 23, and is also connected through a storage switch 24 to one end of a storage capacitor 25 and to the non-inverting input terminal of another operational amplifier 26. The storage switch 24 is adapted to move from its closed position to its open condition in response to the upward movement of the movable mirror 12 (see FIG. 3), and to return to closed position as the second shutter blind runs. The other end of the storage capacitor 25 is connected to the ground. The operational amplifier 26 includes an inverting input terminal which is connected to an output terminal thereof, thus forming an impedance converter which is effective to maintain the photographing information stored across the capacitor 25 for a prolonged period of time. Thus, the voltage at the non-inverting input terminal is equal to the output voltage of the operational amplifier 26. The output terminal of the operational amplifier 26 is connected to the emitter of an NPN transistor 27, which provides a logarithmic expansion. The transistor 27 has its base connected to the ground and has its collector connected to one end of an integrating capacitor 29, the other end of which is connected to the ground, and also connected through a switch 29 to a terminal 30 to which a reference voltage VR1 is applied. The switch 29 changes from its closed to its open condition when the upward movement of the movable mirror 12 is completed. The collector of the transistor 27 is also connected to the non-inverting input terminal of an operational amplifier 31 having its inverting input terminal and its output terminal connected together to form an impedance converter, in the same manner as the operational amplifier 26. The output terminal of the operational amplifier 31 is connected to the inverting input terminal of a comparator 32, the non-inverting input terminal of which is connected to a terminal 33 to which a reference voltage VR2 is applied. The comparator 32 operates to compare the voltage applied to its inverting input terminal against the reference voltage VR2, and to produce an "L" level signal at its output terminal whenever the inverting input is higher than the reference voltage and to produce an "H" level signal when the reference voltage VR2 is higher. The output terminal of the converter 32 is connected to one input of NAND gate 65, which represents one of the signal inputs to a switching logic circuit 6.

The spotwise photometry circuit 3 is constructed in substantially similar manner as the average photometry circuit 2. Specifically, the spotwise photometry circuit 3 includes a photoelectric transducer element 40 used for spotwise photmetry, an operational amplifier 41 for logarithmic compression, an NPN transistor 42, a photographing information display 43, a storage capacitor 45, an operational amplifier 46 acting as an impedance converter, an NPN transistor 47 for logarithmic expansion, an integrating capacitor 48, another operational amplifier 51 also acting as an impedance converter and comparator 52, all of which are connected in an identical manner as the corresponding parts shown in the average photometry circuit 2, and hence will not be described. The only difference of the spotwise photometry circuit 3 over the average photometry circuit 2 is the fact that the transducer element 40 which is used to perform a spotwise photometry is located out of the path of taking light or below the movable mirror 12 so as to receive a fraction of the light passing through the taking lens 11 which has been transmitted through a half mirror 12a, centrally formed in the movable mirror 12, and reflected by a photometric mirror 17 which is disposed on the rear side of the movable mirror 12, as shown in FIG. 3. In this manner, the transducer element is capable of receiving light from a relatively restricted area of the image of an object being photographed, or substantially the central region of the image field. In FIG. 2, the storage switch 44 corresponds to the storage switch 24 shown in the average photometry circuit 2, but as a distinction therefrom, the switch 44 is manually opened before taking a picture, even though the switch 24 is opened as the movable mirror 12 initiates to move upward. Hence, the switch 44 corresponds to the storage switch 3a shown in FIG. 1. It is to be noted however that the storage switch 44 is not operated alone, but is opened in interlocked relationship with the closure of a second switch 82 (5) to be described later. The second switch 82 is opened as is the storage switch 44 as the second shutter blind runs. It will be noted that the collector of the transistor 47 is connected to the collector of the transistor 27 contained in the average photometry circuit 2, so that the reference voltage VR1 is applied to the collector of the transistor 47 through the switch 29 in the average photometry circuit 2. The output terminal of the comparator 52, which represents the output terminal of the spotwise photometry circuit 3, is connected to one input of NAND gate 66, which represents the other signal input to the switching logic circuit 6.

Connected to the non-inverting input terminal of the amplifiers 21, 41 of both the average and the spotwise photometry circuit 2, 3 is the output terminal of an operational amplifier 54 which forms the exposure information presetting circuit 8. The amplifier 54 has an inverting input terminal which is connected through a resistor 55 to a terminal 56 to which a reference voltage VR3 is applied, and also includes a non-inverting input terminal which is connected to the ground. A series combination of a variable resistor 57 which is adjustable in accordance with the film speed, a variable resistor 58 which is used to determine a diaphragm aperture, and a semi-fixed resistor 59 is connected across the output terminal and the inverting input terminal of the amplifier 54, thus forming an inverting amplifier. In this manner, the exposure information presetting circuit 8 supplies exposure information relating to a film speed and a diaphragm aperture which is logarithmically compressed, to the both photometry circuits 2 and 3.

The switching logic circuit 6 of the photometric mode switching apparatus 1 essentially comprises a mode switching circuit 63 including NAND gates 60, 61 and 62, and a switching circuit 68 including an inverter 64 and NAND gates 65, 66 and 67 which are connected to the output side of the switching circuit 63. NAND gates 60 and 61 have their one input connected to the output of the other gate, thereby forming an R-S flipflop. The other input terminal of NAND gate 60 is connected through a resistor 70 to a terminal 71 to which a supply voltage Vcc is applied, and is also connected to the ground through a switch 82. As mentioned previously, the switch 82 represents the second operating switch 5 (see FIG. 1) and is mechanically interlocked with the storage switch 44 (3a) shown in the spotwise photometry circuit 3. The second switch 82 is normally open, as shown, when the storage switch 44 is closed. The other input terminal of NAND gate 61 is connected to a terminal 72 to which a negative reset pulse $\overline{R1}$ is applied when the apparatus is switched on. The R-S flipflop produce an output from NAND gate 60 which depends on the open or closed condition of the switch 82. Specifically, each time the apparatus is switched on, the output level from NAND gate 60 is at its "L" level when the switch 82 is open (switch 44 being closed) and is at its "H" level when the switch 82 is closed (switch 44 being open). The output terminal of NAND gate 60 is connected to one input of NAND gate 62, the other input terminal of which is connected to the ground through a resistor 73 and is also connected through a switch 81 to the terminal 71 to which the supply voltage Vcc is applied. The switch 81 corresponds to the first switch 4 mentioned in connection with FIG. 1 and which is utilized to select a particular photometric mode. When it is open, the average photometric mode is selected while the spotwise photometric mode can be selected by closing the switch 81. The output from NAND gate 62 depends on the condition of the first switch 81 and the output from NAND gate 60 depends on the condition of the second switch 82. Specifically, if the first switch 81 is open as shown to establish the average photometric mode, one input to NAND gate 62 assumes an "L" level, whereby the output from NAND gate 62 will assume an "H" level independently from the output from NAND gate 60 or independently from the condition of the second switch 82. Conversely, when the first switch 81 is closed to establish the spotwise photometric mode, one input of an "H" level is supplied to NAND gate 62 through the switch 81, and accordingly, the output of NAND gate 62 depends on the output from NAND gate 60 or the open or closed condition of the second switch 82. Specifically, when the second switch 82 is open, two inputs to NAND gate 62 are at "H" and "L" levels, respectively, while when the second switch 82 is closed, the both inputs to NAND gate 62 will be at "H" level. Hence, under the condition that the first switch 80 is closed, the output from NAND gate 62 will be at its "H" level if the second switch 82 is open, and will be at its "L" level if the second switch 82 is closed. The output of NAND gate 62 can be summarized as indicated in the table below, depending on the condition of the first and the second switch 81, 82.

|  | First switch 81 | |
|  | Open | Closed |
| --- | --- | --- |
| Second switch 82 | Open | H | H |
| (Storage switch 44) | (Closed) | (average) | (average) |
|  | Closed | H | L |
|  | (Open) | (average) | (spotwise) |

The output terminal of NAND gate 62 is connected to the other input of NAND gate 65 which has its remaining input connected to the output of the average photometry circuit 2, and is also connected through an inverter 64 to the other input of NAND gate 66, the remaining input of which is connected to the output terminal of the spotwise photometry circuit 3. Since an "L" level output from NAND gate 62 is applied to either one of NAND gates 65 and 66, the output level from that one of NAND gates 65 and 66 to which the "L" level output is applied will produce an "H" output, independently from the output from the associated photometry circuit. On the other hand, the output level from the other of NAND gates 65 and 66, to which an "H" level output from NAND gate 62 is applied will depend on the output from the associated photometry circuit. In other words, whenever there is an "H" level output from NAND gate 62, the output level from NAND gate 66 will be "H" independently from the output from the spotwise photometry circuit 3 while the output level from NAND gate 65 depends on the output from the average photometry circuit 2. Conversely, when there is an "L" level output from NAND gate 62, the output level from NAND gate 65 will be "H" independently from the output from the average photometry circuit 2 while the output level from NAND gate 66 will depend on the output from the spotwise photometry circuit 3. Consequently, either the output from the average photometry circuit 2 where the output level from NAND gate 62 is "H" or the output from the spotwise photometry circuit 3 when the output level from NAND gate 62 is "L" is passed to the output terminal of either NAND gate 65 or 66. These output terminals are connected to two inputs of NAND gate 67, the output terminal of which is connected through a resistor 75 to the base of a PNP transistor 76 contained in the shutter drive circuit 7. The transistor 76 has its collector connected to the ground through an electromagnet 77 which constrains the second shutter blind from running while the emitter is connected to the terminal 71 to which the supply voltage Vcc is applied.

In operation, after a film winding operation has been completed and before an exposure is initiated, the switches 24, 29, 44 and 82 assume the conditions illustrated in FIG. 2. Initially considering the average photometric mode, the first switch 81 is open as shown. When the apparatus is switched or under this condition, average photometry takes place. As indicated in the table given above, the output level from NAND gate 62 is "H", so that the photometric mode switching apparatus 1 enables an exposure control by the average photometry circuit 2.

In response to the initiation of a shutter release operation, the storage switch 24 is opened as the movable mirror 12 (see FIG. 3) begins to move upward. Exposure information which is logarithmically compressed is stored across the storage capacitor 25. There occurs a current flow from the terminal 30 through the switch 29 into the collector of the transistor 27 in a manner corresponding to the voltage across the storage capacitor 25. Upon completion of the upward movement of the mirror 12, the switch 29 is opened, whereby the first shutter blind runs, thus initiating an exposure. The integrating capacitor 28 is initially charged to the level of the reference voltage VR1, and begins to discharge through the transistor 27 in accordance with exposure information stored across the storage capacitor 25. As the capacitor 28 discharges, the output voltage from the operational amplifier 31 decreases in a gradual manner. Before a logarithmically expanded exposure period passes, the output voltage from the operational amplifier 31 remains higher than the reference voltage VR2 applied to the comparator 32, which therefore produces an "L" level output. At this time, the output level from NAND gate 65 is "H", so that the output level from NAND gate 67 is "L", turning the transistor 76 on to maintain the electromagnet 77 energized to thereby constrain the second shutter blind from running. As the logarithmically expanded exposure period passes, the voltage across the capacitor 28 or the output voltage from the operational amplifier 31 decreases below the reference voltage VR2, whereupon the output level from the comparator 32 changes to "H". Accordingly, the output level from NAND gate 65 changes to "L", and hence the output level from NAND gate 67 changes to "H", turning the transistor 76 off to deenergize the electromagnet 77, thus allowing the second shutter blind to run to close the shutter.

Considering now the spotwise photometric mode, such mode is established by initially closing the first switch 81. After the apparatus is switched on, the second switch 82 is closed. Since the second switch 82 is interlocked with the storage switch 44 contained in the spotwise photometry circuit 3, the switch 82 is operated when the camera is directed to an object being photographed in a manner such that the image of the object is centrally disposed on the image field. When the first and the second switch 81, 82 are closed, it will be seen from the above table that the output level from NAND gate 62 is at "L", enabling an exposure control by the spotwise photometry circuit 3.

The storage switch 44 is closed in response to the closure of the second switch 82, whereby exposure information which is obtained by spotwise photometry and which is logarithmically compressed is stored across the capacitor 45. Subsequently, a user of the camera moves the camera so that a desired photographic composition is achieved by moving the image of the object being photographed to a suitable location on the image field before a shutter release is operated. The subsequent operation is similar to that of the average photometry circuit 2 and therefore will not be described.

Before the logarithmically expanded exposure period, which is determined by the exposure information stored across the capacitor 45, passes, the output level from comparator 52 is "L" and the output level from NAND gate 66 is "H", so that the output level from NAND gate 67 is at "L", maintaining the electromagnet 77 energized to constrain the second shutter blind against running. When the exposure period passes, the output level from the comparator 52 changes to "H", which causes the electromagnet 77 to be deenergized, thus allowing the second shutter blind to run to close the shutter.

Finally, a situation will be considered when the operation of the first and/or second switch 81, 82 is forgotten. As mentioned previously, the failure of operating these switches are in two ways.

(1) When a user of the camera desires to take a picture in the average photometric mode, he may release the shutter under the condition that the first switch 81, selecting the particular mode, is closed to establish the spotwise photometric mode by oversight or by forgetting. In this instance, the first switch 81 is closed while the second switch 82 is open, so that it will be seen from the table given above that the output level from NAND gate 62 of the switching logic circuit 6 is "H", whereby NAND gate 65 is enabled to permit an exposure control in accordance with an output from the average photometry circuit 2. At this time, because the second switch 82 has not been operated, the storage switch 44 of the spotwise photometry circuit 3 remains closed, so that exposure information in the form of a stored value across the storage capacitor 45 will be indefinite, causing a misleading exposure control output to be delivered from the spotwise photometry circuit to the switching logic circuit 6. However, such output is blocked by NAND gate 66 which is then disabled, preventing the shutter from being controlled in accordance with such a wrong exposure control output. In this manner, an exposure control in the average photometric mode as intended by a user will be achieved.

(2) When a user of the camera desires to take a picture in the spotwise photometric mode, he may release the shutter before the second switch 82 is operated or closed, inadvertently thinking that the second switch has already been closed, even though he is aware of the fact that the first switch 81 has been closed to the position corresponding to the spotwise photometric mode. In this instance, the open or closed condition of the first and second switch 81, 82 remains the same as mentioned above, so that an output from the spotwise photometry circuit 3 is blocked by NAND gate 66 which is then disabled, while allowing an output from the average photometry circuit 2 to be passed through NAND gate 65 for use in an exposure control. It will be appreciated that while an exposure control which occurs in this instance is not based on the spotwise photometry as intended by the user, but a shutter control according to a wrong exposure period which would otherwise result from the spotwise photometry can be avoided, providing a passable photographing operation in accordance with the average photometry.

As discussed, in accordance with the invention, when the first switch 81 is thrown to the position corresponding to the spotwise photometric mode, an exposure control always occurs in accordance with the average photometry unless the second switch 82, which is unique to the spotwise photometric mode, is positively operated, thus avoiding a wrong exposure control which might otherwise result from the failure of operating the second switch in the spotwise photometric mode.

What is claimed is:

1. A photometric mode switching apparatus for a camera of the automatic exposure control type which includes an average photometric circuit and a spotwise photometric circuit and permits a choice between an average photometric mode and a spotwise photometric mode and in which when the spotwise photometric mode is chosen, exposure information as intended by a user of the camera is stored in response to a manual operation of a storage switch to permit a subsequent exposure control in accordance with the stored value; the apparatus comprising:

a first switch which is used to make a choice between the average photometric and the spotwise photometric mode;
   a second switch interlocked with the storage switch; and
   a switching logic circuit operative to pass an output from the spotwise photometry circuit whenever both the first and the second switch are in positions corresponding to the spotwise photometric mode and for passing an output obtained by the average photometry circuit when either one or both of said first and second switches are in positions corresponding to the average photometric mode.

2. A photometric mode switching apparatus according to claim 1 in which the switching logic circuit comprises a mode switching circuit for producing a logical output of one level whenever both the first and the second switch are in positions corresponding to the spotwise photometric mode and for producing a logical output of another level when either one or both of said first and second switches are in positions corresponding to the average photometric mode, and a switching circuit having one pair of inputs fed with one output and another output from the mode switching circuit, respectively, and another pair of inputs fed with outputs obtained by the average photometry circuit and the spotwise photometry circuit, respectively, and for selectively delivering an output from the spotwise photometry circuit whenever the logical output of said one level is produced by the mode switching circuit and an output from the average photometry whenever the logical output of said another level is produced by the mode switching circuit.

3. A photometric mode switching apparatus according to claim 2 in which the mode switching circuit comprises an R-S flipflop for producing a signal in response to the condition of the second switch, and an NAND gate having a first input which is fed from the output of the flipflop and a second input which is fed with the signal representing the condition of the first switch.

4. A photometric mode switching apparatus according to claim 2 in which the switching circuit comprises an inverter for inverting an output from the mode switching circuit, a pair of NAND gates having their one pair of inputs fed with outputs non-inverting and inverted through said inverter from the mode switching circuit, respectively, and having their other pair of inputs fed with an output obtained by the average photometry circuit and an output obtained by the spotwise photometry circuit, respectively, and an NAND gate having its two inputs connected to the respective output of the pair of NAND gates.

5. A camera of the automatic exposure control type including a photometric mode switching apparatus which permits the user to select an average photometric mode or a spotwise photometric mode, comprising:

an average photometry circuit and a spotwise photometry circuit;
   a first switch for selecting an average photometry mode or a spotwise photometry mode;
   a storage switch for storing exposure information to determine the exposure during said spotwise photometric mode;
   a second switch interlocked with said storage switch and which must be operated to store exposure information and to perform a spotwise photometric mode; and
   a switching logic circuit connected to said average photometry circuit and said spotwise photometry circuit and operable by said first and second switches, so that when said first and second switches are in positions corresponding to the spotwise photometric mode, said switching logic circuit is operative to pass an output from said spotwise photometry circuit to a shutter drive circuit, and so that when either one or both of said first and second switches are in positions corresponding to said average photometric mode, said switching logic circuit is operative to pass an output from the average photometry circuit to said shutter drive circuit.

* * * * *

UNITED STATES PATENT AND TRADEMARK OFFICE
CERTIFICATE OF CORRECTION

PATENT NO. : 4,402,587
DATED : September 6, 1983
INVENTOR(S) : Yamasaki

It is certified that error appears in the above—identified patent and that said Letters Patent is hereby corrected as shown below:

Column 2:

Line 8, changed "desired" to --desires--;

Line 49, change "operation" to --operating--.

Signed and Sealed this

Sixth Day of March 1984

[SEAL]

Attest:

GERALD J. MOSSINGHOFF

Attesting Officer        Commissioner of Patents and Trademarks